US005247011A

United States Patent [19]
Tsuji et al.

[11] Patent Number: 5,247,011
[45] Date of Patent: Sep. 21, 1993

[54] ROOM TEMPERATURE-CURABLE ORGANOPOLYSILOXANE COMPOSITION

[75] Inventors: Yuichi Tsuji; Miyoji Fukayama, both of Chiba, Japan

[73] Assignee: Dow Corning Toray Silicone Co., Ltd., Tokyo, Japan

[21] Appl. No.: 798,488

[22] Filed: Nov. 26, 1991

[30] Foreign Application Priority Data

Nov. 28, 1990 [JP] Japan .................................. 2-327261

[51] Int. Cl.⁵ .................................................. C08K 5/33
[52] U.S. Cl. ...................................... 524/731; 524/863; 524/788; 524/786; 524/785; 524/864
[58] Field of Search ............... 524/731, 863, 788, 786, 524/785, 864

[56] References Cited

U.S. PATENT DOCUMENTS

| | | | |
|---|---|---|---|
| 4,216,140 | 8/1980 | Simizu ................... | 524/850 |
| 4,525,565 | 6/1985 | Laisney et al. ......... | 524/863 |
| 4,888,380 | 12/1989 | Kamis et al. ........... | 524/863 |
| 4,973,644 | 11/1990 | Onishi et al. ........... | 528/18 |
| 5,013,781 | 5/1991 | Koshii et al. ........... | 524/863 |
| 5,023,295 | 6/1991 | Bosch et al. ............ | 524/785 |

*Primary Examiner*—John C. Bleutge
*Assistant Examiner*—Karen A. Dean
*Attorney, Agent, or Firm*—Roger H. Borrousch

[57] ABSTRACT

An extrudable, self-extinguishing, room temperature-curable organopolysiloxane is obtained by combining a polydiorganosiloxane having hydrolyzable groups at the terminals, aluminum hydroxide microparticles having diameters not exceeding 50 micrometers, calcium carbonate microparticles having diameters not exceeding 20 micrometers, platinum or a platinum compound, and silane or siloxane containing at least three hydrolyzable groups.

16 Claims, No Drawings

ROOM TEMPERATURE-CURABLE ORGANOPOLYSILOXANE COMPOSITION

BACKGROUND OF THE INVENTION

1. Technical Field

The present invention relates to a room temperature-curable organopolysiloxane composition, and, more particularly, relates to an excellent self-extinguishing room temperature-curable organopolysiloxane composition.

2. Prior Art and Problems to Be Solved by the Invention

Room temperature-curable organopolysiloxane compositions exhibit a number of excellent properties, and as a consequence have entered into service in a variety of fields, for example, civil engineering, construction, general industry, and the electrical and electronics sectors. Nevertheless, these compositions generally suffer from the problem of poor self-extinguishability. There have been attempts at improving their self-extinguishability through addition to particular compositions of large quantities of a filler such as crystalline silica, aluminum hydroxide, titanium dioxide, or carbon black. However, each of the resulting compositions is associated with poor workability and in particular with poor extrudability from the container or cartridge. In addition, compositions which contain carbon black are characterized by a black to gray color, and this precludes their use in some applications.

SUMMARY OF THE INVENTION

The present invention has as an object a room temperature-curable organopolysiloxane composition which manifests an excellent extrudability prior to curing and which manifests an excellent self-extinguishability after curing.

The present invention relates to a room temperature-curable organopolysiloxane composition comprising (A) 100 parts by weight polydiorganopolysiloxane the following general formula

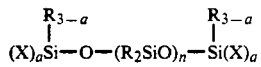

wherein X is a hydrolyzable group selected from the group consisting of alkoxy, haloalkoxy, alkoxyalkoxy, alkenyloxy, ketoximo, and acetoxy, R is a substituted or unsubstituted monovalent hydrocarbon group, a is 1, 2, or 3, and n has a value which provides a viscosity of 100 to 500,000 centipoise at 25° C., (B) 50 to 200 parts by weight microparticulate aluminum hydroxide with an average particle diameter not exceeding 50 micrometers, (C) 30 to 100 parts by weight microparticulate calcium carbonate with an average particle diameter not exceeding 20 micrometers, (D) platinum or a platinum compound, in a quantity sufficient to provide 1 to 200 parts by weight platinum metal per 1,000,000 parts by weight component (A), and (E) 0.5 to 20 parts by weight of a silicon compound which contains at least 3 Si-bonded hydrolyzable groups in each molecule, where the silicon compound is a silane, siloxane, or mixture of silane and siloxane and the hydrolyzable groups are selected from the group consisting of alkoxy, haloalkoxy, alkoxyalkoxy, ketoximo, and acetoxy.

The polydiorganosiloxane of component (A) employed by the present invention is the principal or base component of the composition according to the present invention. Each molecule of this organopolysiloxane must contain at least two terminal groups with the preceding formula. The each R in the preceding formula is an unsubstituted and substituted monovalent hydrocarbon group as exemplified by such monovalent hydrocarbon groups as alkyl groups such as methyl, ethyl, isopropyl, hexyl, and octadecyl; alkenyl groups such as vinyl and hexenyl; cycloalkyl groups such as cyclohexyl and cyclopentyl; alkaryl groups such as benzyl and beta-phenylethyl; phenyl and tolyl; and by those substituted hydrocarbon groups obtained by replacing the hydrogen in the aforesaid hydrocarbon groups with a cyano group such as beta-cyanoethyl, or with halogen such as 1,1,1-trifluoropropyl, or perfluorobutyl. R may consist of only a single species within the individual molecule, or a combination of several species may be present. Taking into consideration ease of synthesis and the balance between the viscosity of the uncured composition and the post-cure mechanical properties, methyl preferably comprises much or all of the R groups. X is a hydrolyzable group as exemplified by alkoxy, haloalkoxy, alkoxyalkoxy, alkenyloxy, ketoximo, acetoxy, and propenoxy.

Polydiorganosiloxane (A) has the following general formula.

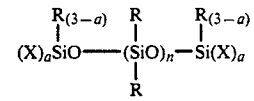

In the preceding formula, X and R are defined as above; a = 1, 2, or 3; and n is a number which provides polydiorganosiloxane with viscosities of 100 to 500,000 centipoise and preferably 500 to 100,000 centipoise at 25° C.

Component (B) of the present invention is an essential component for imparting self-extinguishability to the composition. Component (B) is aluminum hydroxide micropowder with an average particle diameter not exceeding 50 micrometers, preferably not exceeding 10 micrometers. When the average particle size exceeds 50 micrometers, the self-extinguishability deteriorates and-/or the rubber properties of the obtained composition are impaired.

Component (B) should be added at 50 to 200 parts by weight per 100 parts by weight component (A). The self-extinguishability is impaired at less than 50 parts by weight while the addition of more than 200 parts by weight impairs the extrudability of the composition.

Calcium carbonate of component (C) of the present invention is an indispensable component for simultaneously equipping the composition with self-extinguishability, suitable rubber properties, and a good extrudability. The calcium carbonate must have an average particle diameter which does not exceed 20 micrometers, preferably less than one micrometer.

This calcium carbonate may take the form of heavy calcium carbonate, light calcium carbonate, or colloidal calcium carbonate. However, among these, calcium carbonate with smaller particle sizes and preferably colloidal calcium carbonate should be employed in order to equip the composition with satisfactory rubber properties and good extrudability and in order to prevent sedimentation of the calcium carbonate in the uncured composition. The invention does not require that the surface of the calcium carbonate be either treated or untreated, but treatment with, for example, an aliphatic acid, resin acid, or surfactant, is preferred.

Component (C) should be added at 30 to 100 parts by weight per 100 parts by weight of component (A). The self-extinguishability and rubber properties are impaired at less than 30 parts by weight, while the extrudability is compromised at more than 100 parts by weight.

The platinum or platinum compound of component (D) is an essential component for imparting self-extinguishability. It should be added at 1 to 200 parts by weight as platinum metal, preferably 3 to 200 parts by weight, and more preferred at 10 to 100 parts by weight as platinum metal per one million parts by weight (ppm) component (A). Self-extinguishability is not manifested at less than 1 ppm, while exceeding 200 ppm is uneconomical because doing so does not result in further improvement in the self-extinguishability. The platinum and platinum compound under consideration are exemplified by platinum micropowders; platinum powder supported on a carrier such as alumina, silica gel, or asbestos; chloroplatinic acid; and complexes between chloroplatinic acid and alcohols, ethers, aldehydes, or vinylsiloxanes.

To promote dispersion in the composition, the platinum or platinum compound is typically dissolved or dispersed in organopolysiloxane oil or an organic solvent such as isopropanol, ethanol, benzene, toluene, or xylene.

Component (E), a silicon compound having at least three hydrolyzable groups, functions as a crosslinker and can be a silane, a siloxane oligomer, or a mixture of a silane and a siloxane oligomer. These silanes and siloxane oligomers are exemplified as follows: alkoxysilanes such as tetraethoxysilane, methyltrimethoxysilane, ethyltrimethoxysilane, vinyltrimethoxysilane, 3,3,3-trifluoropropyltrimethoxysilane, beta-cyanoethyltrimethoxysilane, tetraisopropoxysilane, tetrabutoxysilane, phenyltrimethoxysilane, octadecyltrimethoxysilane, tetra(beta-chloroethoxy)silane, tetra(2,2,2-trifluoroethoxy)silane, propyltris(delta-chlorobutoxy)silane, and methyltris(methoxyethoxy)silane; alkoxysiloxanes such as ethyl polysilicate and dimethyltetramethoxydisiloxane; and alkenyloxysilanes such as methyltri(isopropenoxy)silane, and vinyltri(isopropenoxy)silane; and ketoximosilanes such as methyltris(methylethylketoximo)silane, vinyltris(methylethylketoximo)silane, phenyltris(methylethylketoximo)silane, methyltris(diethylketoximo)silane, and tetra(methylethylketoximo)silane.

Component (E) should be added within the range of 0.5 to 20 parts by weight per 100 parts by weight of component (A). The specific quantity of component (E) should be optimally selected in accordance with, for example, the quantity of water in the composition and the concentration of groups X in component (A). The hydrolyzable group in component (E) is preferably the same as the hydrolyzable group in component (A). When such is the case, it then becomes possible during preparation of the composition to produce a mixture of component (A) and component (E) by preliminarily reacting excess component (E) with hydroxyl-terminated organopolysiloxane which corresponds to component (A).

The composition of the present invention may optionally contain a catalyst in order to accelerate the condensation reaction between components (A) and (E). Suitable catalysts are exemplified by the metal salts of monocarboxylic acids such as lead 2-ethyloctoate, dibutyltin diacetate, dibutyltin 2-ethylhexoate, dibutyltin dilaurate, butyltin tri-2-ethylhexoate, dibutyltin acetylacetonate, iron 2-ethylhexoate, cobalt 2-ethylhexoate, manganese 2-ethylhexoate, stannous caprylate, tin naphthenate, tin oleate, tin butyrate, zinc naphthenate, zinc stearate, and titanium naphthenate; titanates such as tetrabutyl titanate, tetraphenyl titanate, tetra-2-ethylhexyl titanate, tetraoctadecyl titanate, triethanolamine titanate, and ethylene glycol titanate; the organosiloxytitanium compounds disclosed in U.S. Pat. No. 3,294,739, in which the organosiloxy group is bonded to the titanium atom via Si-O-Ti; the beta-dicarbonyltitanium compounds disclosed in U.S. Pat. No. 3,334,067 with the following formula

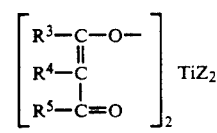

wherein $R^3$, $R^4$, and $R^5$ are monovalent hydrocarbon groups having 1 to 18 carbon atoms; and Z is a group selected from the group consisting of monovalent aliphatic hydrocarbon groups, monovalent acyloxy groups (in each case having 1 to 18 carbon atoms), the hydroxyl group, and the divalent oxygen atom participating in the Ti-O-Ti bond); amines such as hexylamine and dodecylamine; amine salts such as hexylamine acetate and dodecylamine phosphate; quaternary ammonium salts such as benzyltrimethylammonium acetate; and alkali metal salts such as potassium acetate. When it is in fact necessary to employ one of these cure-accelerating catalysts, it should be added at 0.001 to 10 parts by weight and preferably at 0.01 to 5 parts by weight, in each case per 100 parts by weight component (A).

The composition according to the present invention is prepared simply by mixing components (A), (B), (C), (D), and (E) and any of the aforementioned optional components to homogeneity. 0.2 to 10 Parts by weight of a vinyl-containing organopolysiloxane with a viscosity at 25° C. of 20 to 1,000 centipoise can be added when the uncured composition must be nonsagging. The terminals of this particular organopolysiloxane are preferably blocked by the hydroxyl group, and the non-vinyl organic groups in this polysiloxane are exemplified by methyl and phenyl. Moreover, this polysiloxane preferably contains 5 to 50 weight % vinyl group. Otherwise, those additives known in the art for use in ordinary room temperature-curable organopolysiloxane compositions may be admixed on an optional basis into the composition of the present invention as long as the object of the present invention is not compromised thereby. Examples in this regard are organic solvents, low-molecular-weight organopolysiloxanes, various types of fillers and pigments (e.g., magnesium oxide, alumina, zinc oxide, iron oxide), flame retardants such as manganese carbonate and azobisisobutyronitrile, heat stabilizers such as cerium hydroxide and cerium oxide, and adhesion promoters such as silane coupling agents.

The present invention will be explained in greater detail through the following illustrative examples. In the examples and comparison examples, parts=weight parts and the viscosity is the value at 25° C. The various properties considered below were measured using the following test methods.

Extrudability

The particular room temperature-curable organopolysiloxane composition was filled into a 2 mL syringe. The time required for extrusion (extrusion pressure = 2 kg/cm$^2$) of the total quantity was then measured and is reported in seconds.

Rubber properties

The particular room temperature-curable organopolysiloxane composition was cured at room temperature for 7 days to give a 3 mm-thick silicone rubber sheet. The physical properties (hardness, tensile strength, elongation) of the silicone rubber sheet thus obtained were measured in accordance with the methods in JIS K 6301.

Measurement of self-extinguishability

This property was measured in accordance with the flame retardancy test method of UL 94 V. First, the particular room temperature-curable organopolysiloxane composition was cured to give a 0.8 mm-thick silicone rubber sheet. This sheet was then cut into a test specimen with a length of 127 mm and a width of 12.7 mm. The test specimen was hung vertically under draft-free conditions, and the bottom of the test specimen was exposed twice (10 seconds each) to the flame from a 1,000 BTU/ft$^3$ gas burner. The time (seconds) required for extinction of the flame was measured in each case. This double flame contact test was conducted on each of 5 test specimens, and the total value of the 10 observations was reported as the self-extinguishability (unit: seconds).

EXAMPLE 1

The following were mixed at room temperature and in the sequence given into a mixture of 100 parts alpha,omega-bis(methyldimethoxysiloxy)polydimethylsiloxane (viscosity = 16,000 centipoise) and 1.0 part alpha,omega-dihydroxypolymethylvinylsiloxane (viscosity = 50 centipoise): 70 parts aluminum hydroxide micropowder with an average particle size of 1.0 micrometers, 70 parts colloidal calcium carbonate (average particle size = 0.08 micrometers) whose surface had been treated with fatty acid, and isopropanolic chloroplatinic acid solution sufficient to give 22 ppm as platinum. This was followed by mixing to homogeneity in vacuo while heating at 180° C. 4.0 Parts methyltrimethoxysilane and 1.0 part diisopropoxybis(ethylacetoacetate)titanium were mixed to homogeneity under moisture free conditions into 100 parts of the preceding mixture, and the product was then sealed into aluminum tubes.

The composition's extrudability and post-cure rubber properties of hardness, tensile strength, elongation and flame retardancy were measured by the method described above. These results are reported in the Table.

EXAMPLE 2

2.0 Parts alpha,omega-dihydroxypolymethylvinylsiloxane (viscosity = 50 centipoise) and 5.0 parts methyltris(methylethylketoximo)silane were mixed into 100 parts alpha,omega-dihydroxypolydimethylsiloxane (viscosity = 13,000 centipoise) to giving a mixture whose main component was polydimethylsiloxane bearing the methyldi(methylethylketoximo)siloxy group at both terminals. The following were mixed at room temperature and in the sequence given into this mixture: 70 parts aluminum hydroxide micropowder with an average particle size of 1.0 micrometers, 70 parts colloidal calcium carbonate (average particle size = 0.08 micrometers) whose surface had been treated with fatty acid, and isopropanolic chloroplatinic acid solution sufficient to give 22 ppm platinum metal. This was followed by mixing in vacuo to homogeneity. A room temperature-curable organopolysiloxane composition was then prepared by admixing the following to homogeneity under moisture free conditions per 100 parts of the preceding mixture: 2.1 parts methyltris(methylethylketoximo)silane, 0.5 part N-beta-(aminoethyl)-gamma-aminopropyltrimethoxysilane, and 0.07 part dibutyltin dilaurate. The resulting room temperature-curable organopolysiloxane composition was sealed into aluminum tubes. The composition's extrudability, post-cure rubber properties, and flame retardancy were then measured, and these results are reported in the Table.

EXAMPLE 3

2.0 Parts alpha, omega-dihydroxypolymethylvinylsiloxane (viscosity = 50 centipoise) and 5.0 parts methyltris(methyl-ethylketoximo)silane were mixed into 100 parts alpha,omega-dihydroxypolydimethylsiloxane (viscosity = 12,000 centipoise) giving a mixture whose main component was polydimethylsiloxane bearing the methyldi(methylethylketoximo)siloxy group at both terminals. Into the resulting mixture, the following were mixed at room temperature and in the sequence given: 100 parts aluminum hydroxide micropowder with an average particle size of 1.0 micrometers, 50 parts colloidal calcium carbonate (average particle size = 0.08 micrometers) whose surface had been treated with fatty acid, and isopropanolic chloroplatinic acid solution sufficient to give 22 ppm as platinum metal. The resulting mixture was mixed in vacuo to homogeneity. The following were admixed to homogeneity under moisture free conditions: 100 parts of the preceding mixture, 2.0 parts methyltris(methylethyl ketoximo)silane, 0.5 part N-beta-(aminoethyl)-gamma-aminopropyltrimethoxysilane, and 0.06 part dibutyltin dilaurate. The resulting room temperature-curable organosiloxane composition was sealed into aluminum tubes. The composition was tested as in Example 1, and these results are reported in the Table.

EXAMPLE 4

5.0 Parts methyltris(methylethylketoximo)silane was mixed into 100 parts alpha,omega-dihydroxypolydimethylsiloxane (viscosity = 12,000 centipoise) to give a mixture whose main component was polydimethylsiloxane bearing the methyldi(methylethylketoximo)siloxy group at both terminals. Into the resulting mixture, the following were mixed at room temperature and in the sequence given: 100 parts aluminum hydroxide micropowder with an average particle size of 1.0 micrometers, 50 parts precipitated calcium carbonate (average particle size = 2.2 micrometers), and isopropanolic chloroplatinic acid solution sufficient to give 22 ppm as platinum metal. The resulting mixture was then mixed in vacuo to homogeneity. The following were admixed to homogeneity under moisture free conditions: 100 parts of the preceding mixture, 2.0 parts methyltris(methylethyl ketoximo)silane, 0.5 part N-beta-(aminoethyl)-gamma-aminopropyltrimethoxysilane, and 0.06 part dibutyltin dilaurate. The resulting room temperature-curable organopolysiloxane composition was sealed into aluminum tubes. This composition was tested as in Example 1, and these results are reported in the Table.

COMPARISON EXAMPLE 1

A room temperature-curable organopolysiloxane composition was prepared by the procedure of Example 3, but in this case, omitting the colloidal calcium carbonate used in Example 3 and increasing the addition of the aluminum hydroxide micropowder to 150 parts to compensate. This composition was tested as in Example 1, and these results are reported in the Table.

COMPARISON EXAMPLE 2

A room temperature-curable organopolysiloxane composition was prepared by the procedure of Example 3, but in this case, employing 5 parts of a surface-hydrophobicized silica in place of the colloidal calcium carbonate employed in Example 3. This surface-hydrophobicized silica was prepared by treating a dry-method silica with a BET specific surface area of 130 m2/g with hexamethyldisilazane. This composition was tested as in Example 1, and these results are reported in the Table.

TABLE

|  | PRESENT INVENTION | | | | COMPARISON EXAMPLES | |
|---|---|---|---|---|---|---|
|  | 1 | 2 | 3 | 4 | 1 | 2 |
| EXTRUDABILITY (seconds) | 58 | 50 | 57 | 43 | 107 | 59 |
| FLUIDITY | + | + | + | x | + | x |
| HARDNESS (JIS A) | 57 | 64 | 67 | 65 | 65 | 35 |
| TENSILE STRENGTH (kg/cm2) | 23 | 25 | 30 | 28 | 25 | 21 |
| ELONGATION (%) | 250 | 150 | 180 | 150 | 180 | 300 |
| SELF-EXTINGUISHABILITY (seconds) | 20 | 27 | 33 | 19 | 19 | 73 |

+ = not fluid
x = semifluid

EFFECTS OF THE INVENTION

Because the room temperature-curable organopolysiloxane composition contains components (A) through (E), and in particular because it contains the specified quantities of components (B), (C), and (D), it is characterized both by an excellent extrudability from containers prior to its cure and by the ability to cure into an excellent self-extinguishing silicone rubber.

That which is claimed:

1. A room temperature-curable organopolysiloxane composition comprising a self-extinguishing room temperature-curable composition comprising
   (A) 100 parts by weight of polydiorganosiloxane having the following general formula

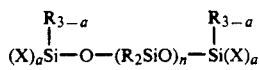

wherein X is a hydrolyzable group selected from the group consisting of alkoxy, haloalkoxy, alkoxyalkoxy, alkenyloxy, ketoximo, and acetoxy, R is a substituted or unsubstituted monovalent hydrocarbon group, a is 1, 2, or 3, and n has a value which provides a viscosity of 100 to 500,000 centipoise at 25° C., (B) 50 to 200 parts by weight microparticulate aluminum hydroxide with an average particle diameter not exceeding 50 micrometers, (C) 30 to 100 parts by weight microparticulate calcium carbonate with an average particle diameter not exceeding 20 micrometers.

(D) platinum or a platinum compound, in a quantity sufficient to provide 1 to 200 parts by weight platinum metal per 1,000,000 parts by weight component (A), and (E) 0.5 to 20 parts by weight of a silicon compound which contains at least 3 Si-bonded hydrolyzable groups in each molecule, where the silicon compound is a silane, siloxane, or mixture of silane and siloxane, and the hydrolyzable groups are selected from the group consisting of alkoxy, haloalkoxy, alkoxyalkoxy, alkenyloxy, ketoximo, and acetoxy.

2. The room temperature-curable organopolysiloxane composition according to claim 1 in which the average particle size of the aluminum hydroxide of (B) does not exceed 10 micrometers.

3. The room temperature-curable organopolysiloxane composition according to claim 1 in which (C) is a colloidal calcium carbonate having an average particle size of less than 1 micrometer.

4. The room temperature-curable organopolysiloxane composition according to claim 2 in which (C) is a colloidal calcium carbonate having an average particle size of less than 1 micrometer.

5. The room temperature-curable organopolysiloxane composition according to claim 1 further comprising 0.2 to 10 parts by weight of a vinyl-containing polyorganosiloxane having 5 to 50 weight percent vinyl group and a viscosity of from 20 to 1,000 centipoise at 25° C.

6. The room temperature-curable organopolysiloxane composition according to claim 5 in which the hydrolyzable group is ketoximo and R is methyl.

7. The room temperature-curable organopolysiloxane composition according to claim 6 further comprising a catalyst to accelerate the cure between component (A) and (E).

8. The room temperature-curable organopolysiloxane composition according to claim 7 in which the catalyst is a metal salt of a monocarboxylic acid.

9. The room temperature-curable organopolysiloxane composition according to claim 8 in which the metal salt of monocarboxyic acid is dibutyltin dilaurate.

10. The room temperature-curable organopolysiloxane composition according to claim 9 further comprising N-beta(aminoethyl)-gamma-aminopropyltrimethoxysilane.

11. The room temperature-curable organopolysiloxane composition according to claim 10 in which the silicon compound is methyltri(methylethylketoximo)silane.

12. The room temperature-curable organopolysiloxane composition according to claim 4 in which the hydrolyzable group is alkoxy.

13. The room temperature-curable organopolysiloxane composition according to claim 12 in which the alkoxy is methoxy.

14. The room temperature-curable organopolysiloxane composition according to claim 13 further comprising a catalyst to accelerate the cure between components (A) and (E).

15. The room temperature-curable organopolysiloxane composition according to claim 13 in which the catalyst is a titanate.

16. The room temperature-curable organopolysiloxane composition according to claim 15 in which the titanium compound is diisopropoxybis(ethylacetoacetate)titanium.

* * * * *